(12) United States Patent
Birang et al.

(10) Patent No.: US 6,383,058 B1
(45) Date of Patent: May 7, 2002

(54) ADAPTIVE ENDPOINT DETECTION FOR CHEMICAL MECHANICAL POLISHING

(75) Inventors: Manoocher Birang, Los Gatos; Boguslaw Swedek, San Jose, both of CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/493,859

(22) Filed: Jan. 28, 2000

(51) Int. Cl.[7] .................................. B24B 7/22
(52) U.S. Cl. ........................ 451/41; 451/6; 451/288
(58) Field of Search ................... 451/6, 7, 10, 11, 451/8, 41, 42, 67, 159, 259, 277, 285, 287, 288, 342

(56) References Cited

U.S. PATENT DOCUMENTS

| | | | |
|---|---|---|---|
| 5,081,796 A | 1/1992 | Schultz | 51/165 |
| 5,413,941 A | 5/1995 | Koos et al. | 437/8 |
| 5,433,651 A | 7/1995 | Lustig et al. | 451/6 |
| 5,605,760 A | 2/1997 | Roberts | 428/409 |
| 5,640,242 A | 6/1997 | O'Boyle et al. | 356/381 |
| 5,672,091 A | 9/1997 | Takahashi et al. | 451/6 |
| 5,738,574 A * | 4/1998 | Tolles et al. | 451/288 |
| 5,791,969 A | 8/1998 | Lund | 451/5 |
| 5,838,447 A | 11/1998 | Hiyama et al. | 356/381 |
| 5,851,135 A * | 12/1998 | Sandhu et al. | 451/6 X |
| 5,872,633 A | 2/1999 | Holzapfel et al. | 356/381 |
| 5,893,796 A | 4/1999 | Birang et al. | 451/526 |
| 5,910,846 A * | 6/1999 | Sandhu | 451/6 X |
| 5,949,927 A | 9/1999 | Tang | 385/12 |
| 5,964,643 A | 10/1999 | Birang et al. | 451/6 |
| 6,071,177 A * | 6/2000 | Lin et al. | 451/6 |
| 6,102,775 A * | 8/2000 | Ushio et al. | 451/6 |
| 6,159,073 A * | 12/2000 | Wiswesser et al. | 451/6 |
| 6,190,234 B1 * | 2/2001 | Swedek et al. | 451/6 |

FOREIGN PATENT DOCUMENTS

| | | |
|---|---|---|
| EP | 881 040 A2 | 12/1998 |
| EP | 881 484 A2 | 12/1998 |
| JP | 3-234467 | 10/1991 |

* cited by examiner

Primary Examiner—Joseph J. Hail, III
Assistant Examiner—Anthony Ojini
(74) Attorney, Agent, or Firm—Fish & Richadrson

(57) ABSTRACT

An apparatus, as well as a method, brings a surface of a substrate into contact with a polishing pad. A light beam is directed by an optical endpoint detection system to impinge the surface of the substrate. A signal from the optical endpoint detection system is monitored, and if a first endpoint criterion is not detected within a first time window, polishing is stopped at a default polishing time. If the first endpoint criterion is detected within the first time window, the signal is monitored for the second endpoint criterion, and polishing stops if the second endpoint criterion is detected.

33 Claims, 7 Drawing Sheets

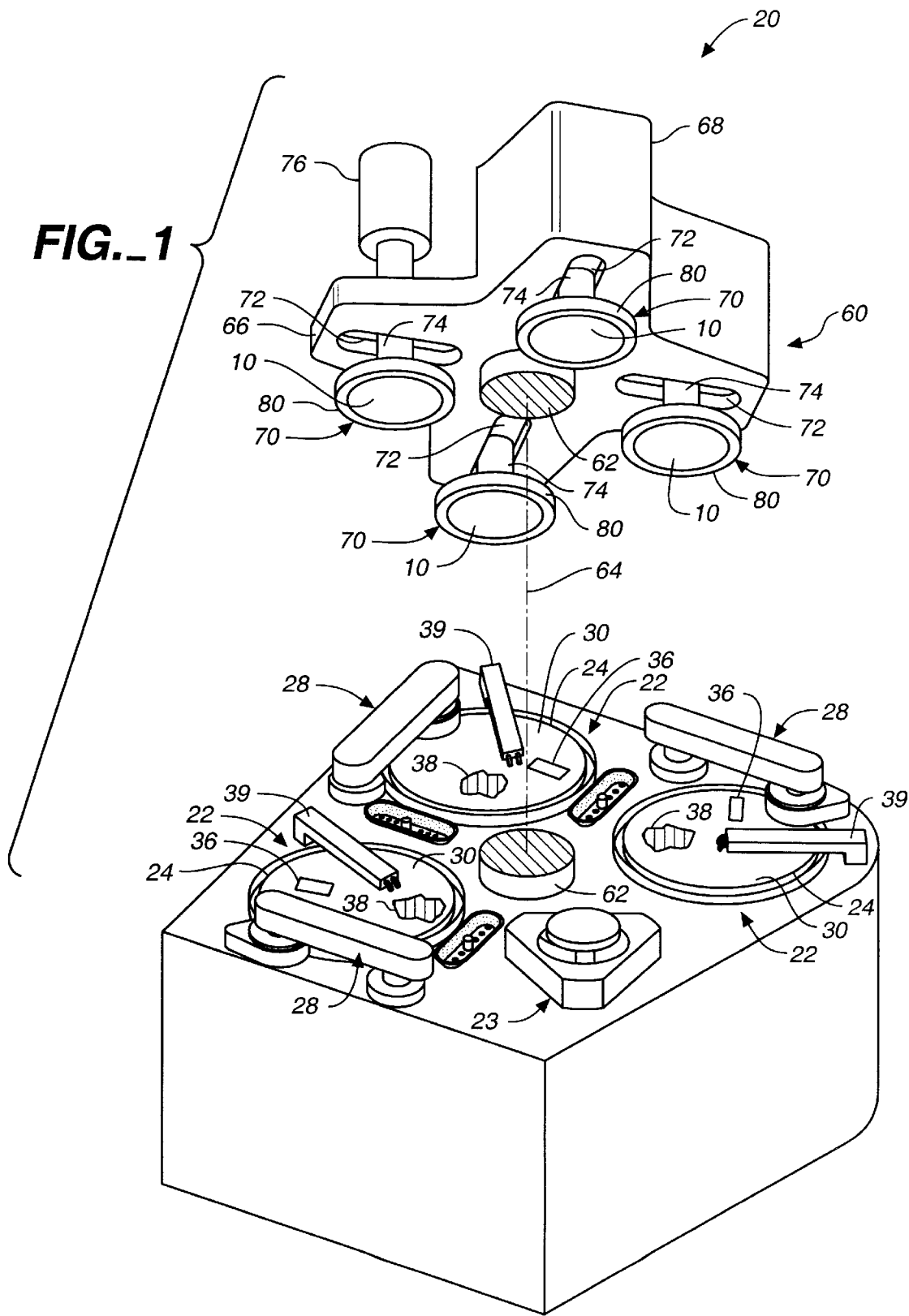
FIG._1

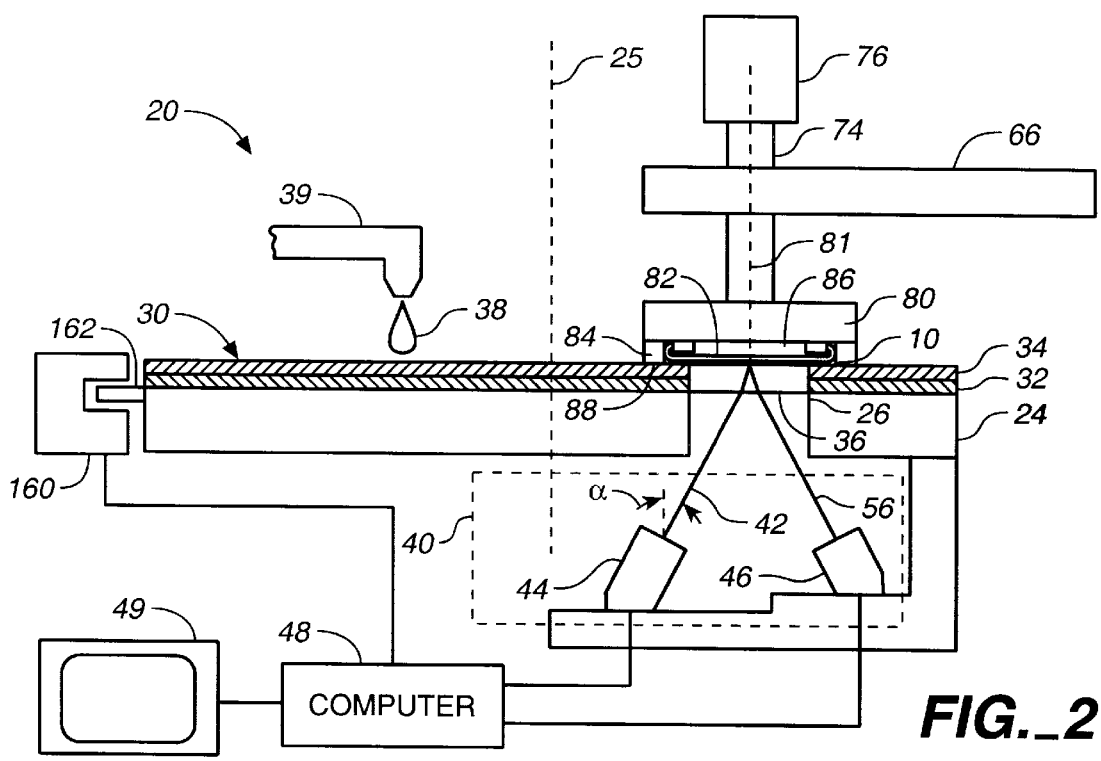
FIG._2
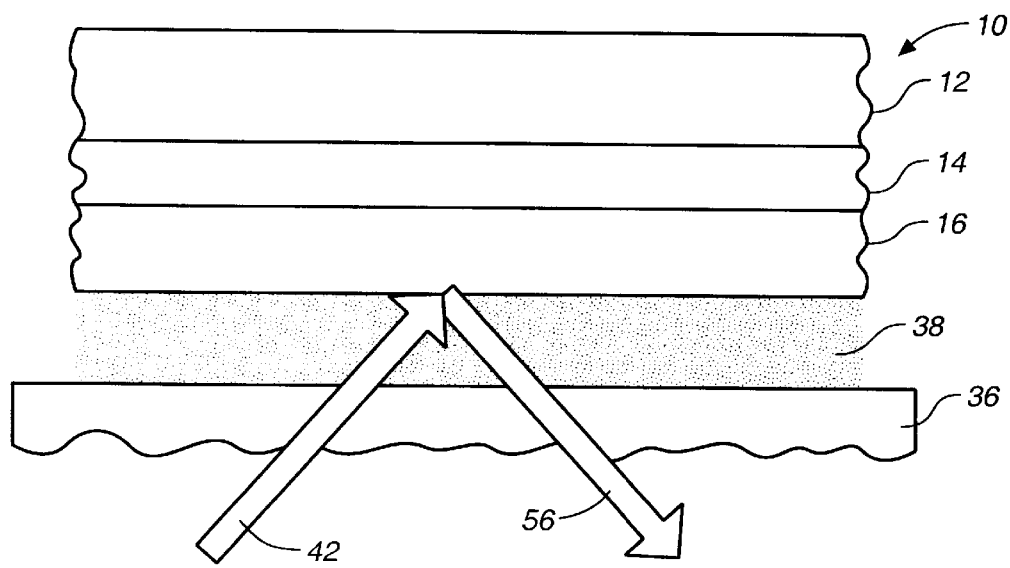
FIG._3

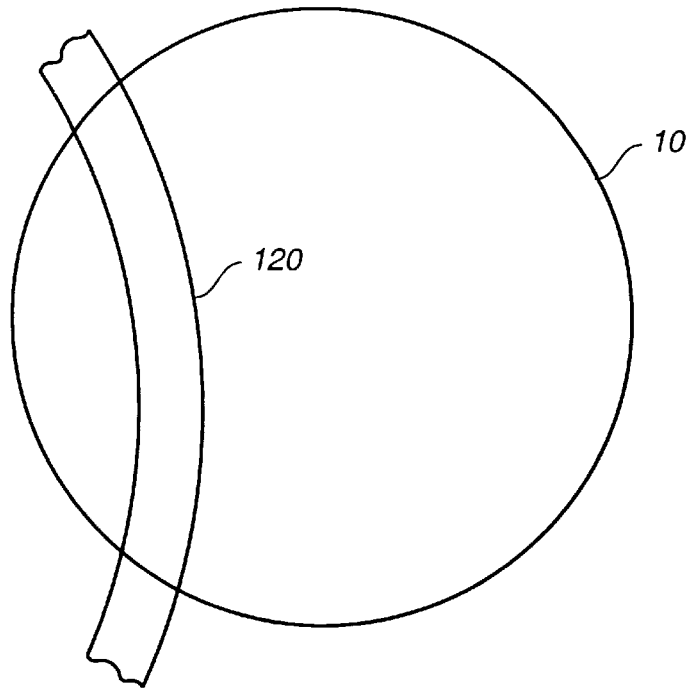
FIG._4
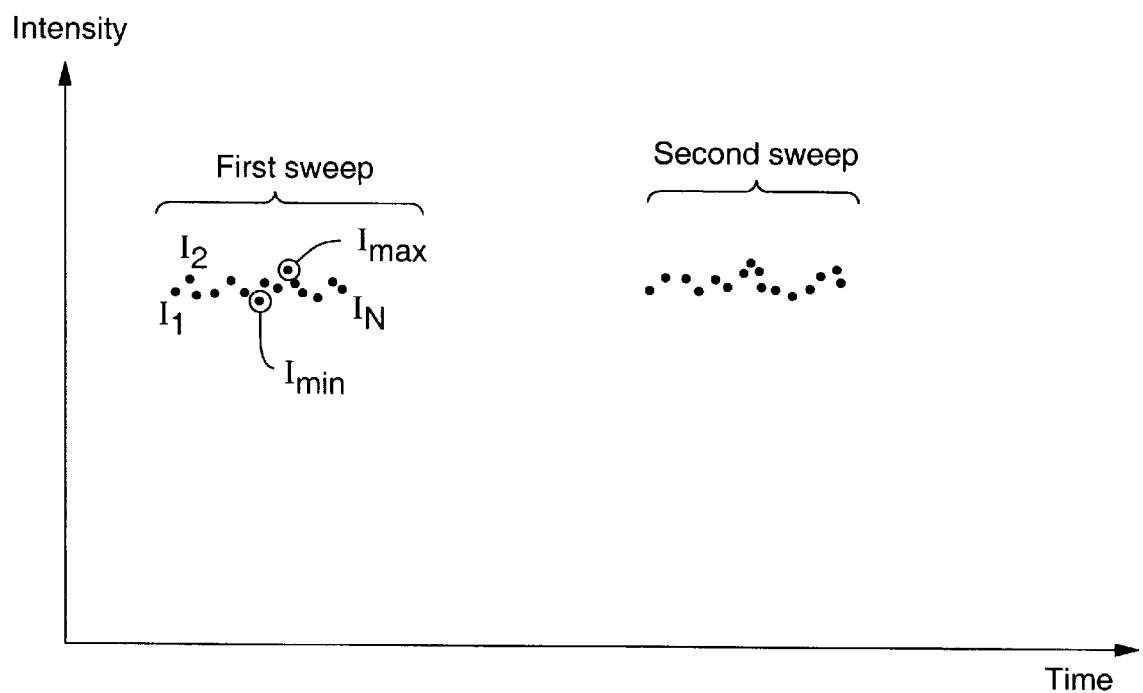
FIG._5

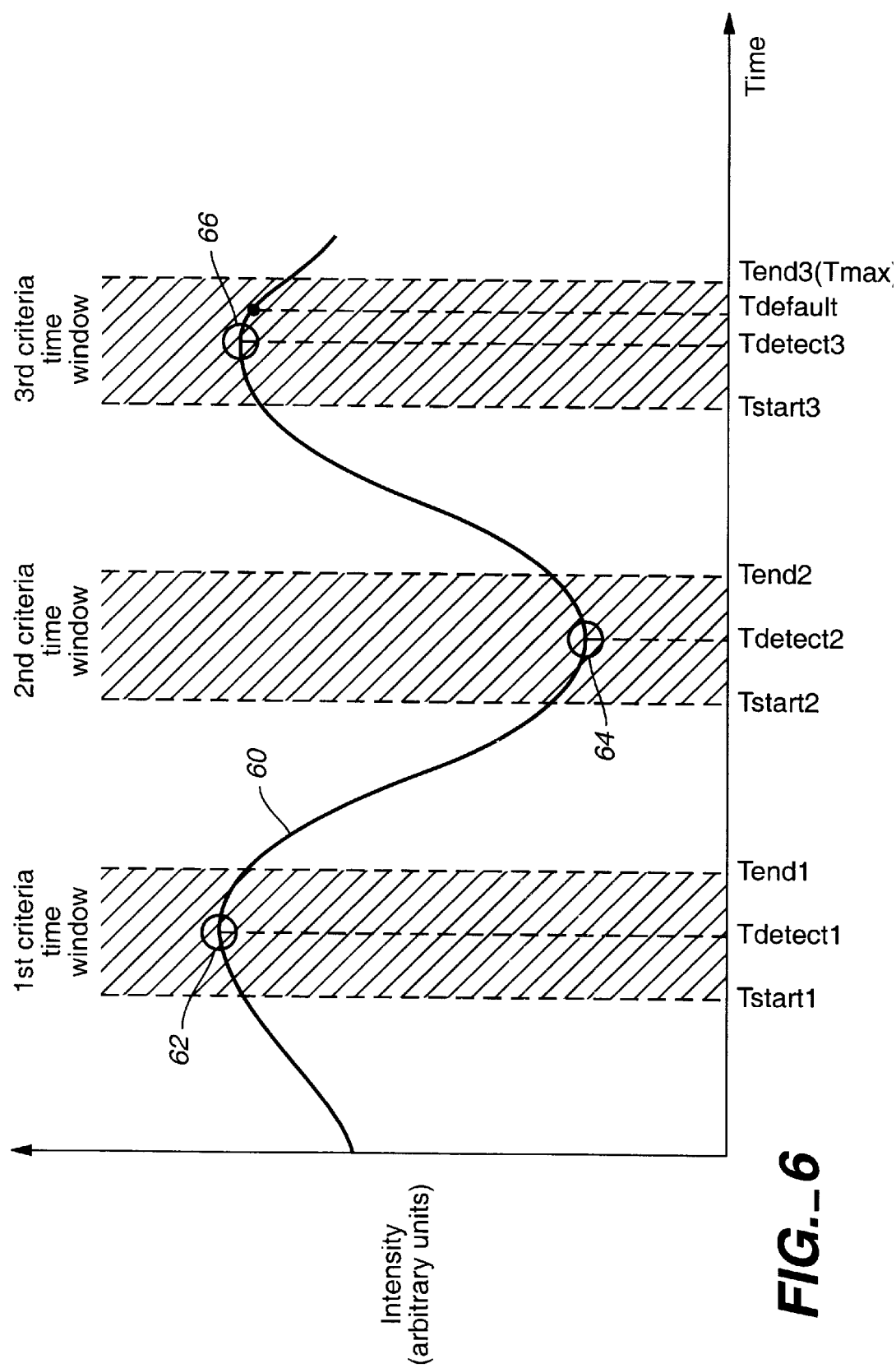
FIG._6

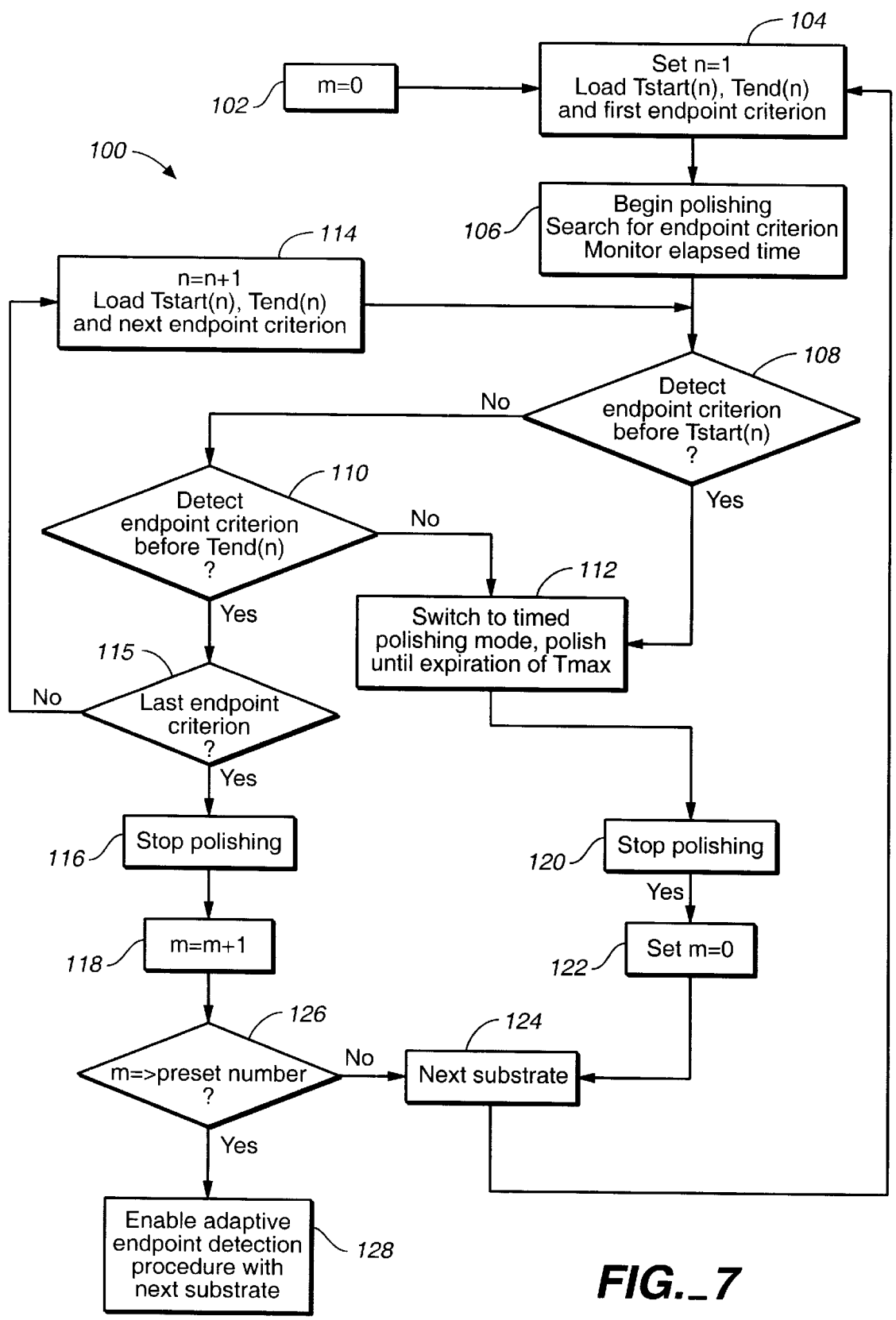
FIG._7

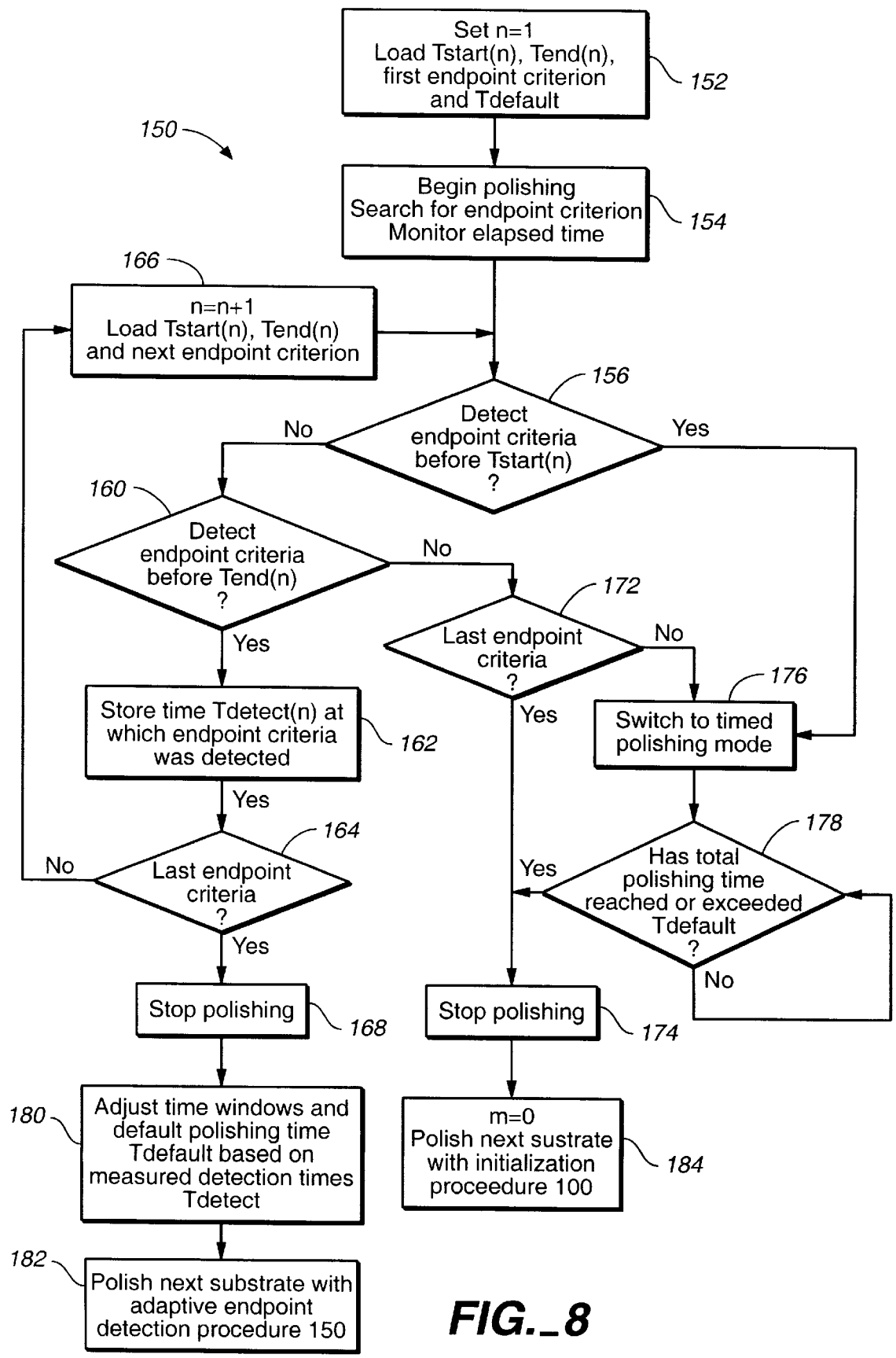
FIG._8

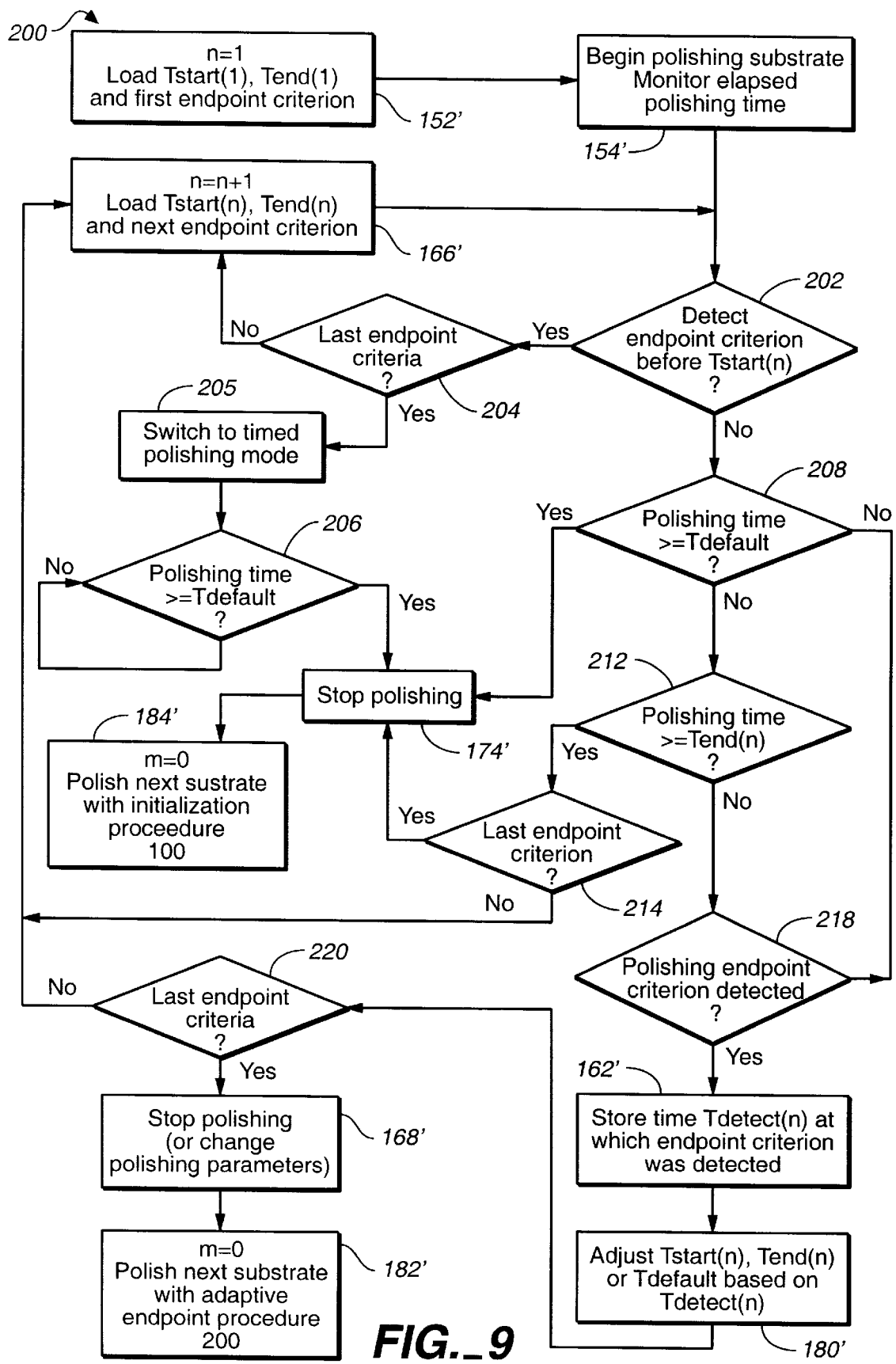

ADAPTIVE ENDPOINT DETECTION FOR CHEMICAL MECHANICAL POLISHING

BACKGROUND

The present invention relates generally to chemical mechanical polishing of substrates, and more particularly to methods and apparatus for detecting a polishing endpoint during a chemical mechanical polishing operation.

An integrated circuit is typically formed on a substrate by the sequential deposition of conductive, semiconductive or insulative layers on a silicon wafer. One fabrication step involves depositing a filler layer over a patterned stop layer, and planarizing the filler layer until the stop layer is exposed. For example, a conductive filler layer may be deposited on a patterned insulative stop layer to fill the trenches or holes in the stop layer. After planarization, the portions of the conductive layer remaining between the raised pattern of the insulative layer form vias, plugs and lines that provide conductive paths between thin film circuits on the substrate.

Chemical mechanical polishing (CMP) is one accepted method of planarization. This planarization method typically requires that the substrate be mounted on a carrier or polishing head. The exposed surface of the substrate is placed against a rotating polishing disk pad or belt pad. The polishing pad may be either a "standard" pad or a fixed-abrasive pad. A standard pad has a durable roughened surface, whereas a fixed-abrasive pad has abrasive particles held in a containment media. The carrier head provides a controllable load, i.e., pressure, on the substrate to push it against the polishing pad. A polishing slurry, including at least one chemically-reactive agent, and abrasive particles if a standard pad is used, is supplied to the surface of the polishing pad.

One problem in CMP is determining whether the polishing process is complete, i.e., whether a substrate layer has been planarized to a desired flatness or thickness. Variations in the initial thickness of the substrate layer, the slurry composition, the polishing pad condition, the relative speed between the polishing pad and the substrate, and the load on the substrate can cause variations in the material removal rate. These variations cause variations in the time needed to reach the polishing endpoint. Therefore, the polishing endpoint cannot be determined merely as a function of polishing time.

One way to determine the polishing endpoint is to remove the substrate from the polishing surface and examine it. For example, the substrate may be transferred to a metrology station where the thickness of a substrate layer is measured, e.g., with a profilometer or a resistivity measurement. If the desired specifications are not met, the substrate is reloaded into the CMP apparatus for further processing. This is a time-consuming procedure that reduces the throughput of the CMP apparatus. Alternatively, the examination might reveal that an excessive amount of material has been removed, rendering the substrate unusable.

More recently, in-situ optical monitoring of the substrate has been performed, e.g., with an interferometer or reflectometer, in order to detect the polishing endpoint. Unfortunately, noise in the signal generated by the optical monitoring system may make it difficult to determine the proper endpoint.

SUMMARY

In one aspect, the invention is directed to a computer-implemented endpoint detection method for a chemical mechanical polishing operation. In the method a first endpoint criterion, a first time window for the first endpoint criterion, and a second endpoint criterion are stored. A signal is received from a polishing endpoint detection system, and the signal is monitored for the first endpoint criterion. If the first endpoint criterion is not detected within the first time window, polishing is stopped at a default polishing time. On the other hand, if the first endpoint criterion is detected within the first time window, the signal is monitored for the second endpoint criterion and polishing is stopped if the second endpoint criterion is detected.

Implementations of the invention may include one or more of the following features. A second time window for the second endpoint criterion may be stored, and polishing may stop at a default polishing time if the second endpoint criterion is detected before the second time window. If the second endpoint criterion not detected, polishing may stop at the end of the second time window. A third endpoint criterion and a third time window for the third endpoint criterion may be stored. The third time window may be located before the first time window. If the third endpoint criterion is not detected within the third time window, polishing may be stopped at a default polishing time. A detection time at which the first or second endpoint criterion is detected may be stored. The default polishing time may be modified if the second endpoint criterion is detected within the second time window. The first time window may be modified if the first endpoint criterion is detected within the first time window. The endpoint detection system may optically monitors the substrate. The polishing operation may polish a metal or dielectric layer on the substrate. The endpoint detection method may be performed after the first endpoint criteria is detected in the first time window and the second endpoint criteria is detected in the second time window for a plurality of consecutive substrates.

In another aspect, the invention is directed to a computer-implemented endpoint detection method for a chemical mechanical polishing operation. In this method a series of N endpoint criteria are stored, each endpoint criteria associated with a time window. N is equal to or greater than 2. A signal is received from a polishing endpoint detection system, and the signal is monitored for the series of endpoint criteria. Whether an endpoint criterion is detected within the associated time window is determined, and if the endpoint criterion is detected within the associated time window, the signal is monitored for the next endpoint criterion in the series. The determining and monitoring steps are iterated until one of the endpoint criterion is not detected within the associated time window or a last endpoint criterion is detected within the associated time window. If the former, polishing is stopped at a default polishing time. If the later, polishing is stopped based on detection of the last endpoint criterion.

In another aspect, the invention is directed to a method of chemical mechanical polishing. In the method, a substrate is brought into contact with a polishing surface, and relative motion is created between the substrate and the polishing surface. A first endpoint criterion, a first time window for the first endpoint criterion, and a second endpoint criterion are stored. A signal is received from a polishing endpoint detection system, and the signal is monitored for the first endpoint criterion. If the first endpoint criterion is not detected within the first time window, polishing is stopped at a default polishing time. On the other hand, if the first endpoint criterion is detected within the first time window, the signal is monitored for the second endpoint criterion and polishing is stopped if the second endpoint criterion is detected.

In another aspect, the invention is directed to a method of chemical mechanical polishing. In the method, a substrate is brought into contact with a polishing surface, and relative motion is created between the substrate and the polishing surface. A plurality of endpoint criteria, a plurality of time windows and a default polishing time are stored. Each endpoint criterion is associated with one of the time windows. A signal from an endpoint detection system is monitored for the endpoint criteria. The times at which the endpoint criteria are detected are stored. Polishing stops after one of the default polishing times or detection of a last of the endpoint criteria. At least one of the default polishing time and the time windows is adjusted based on at least one of the times at which an endpoint criterion was detected.

Implementations of the invention may include one or more of the following features. The adjusting step may occurs if each endpoint criterion is detected in its associated time window. The adjusting step may include setting the default polishing time equal to a time of detection of the last of the endpoint criteria. The adjusting step may includes setting the default polishing time equal to an average of detection times of the last of the endpoint criteria in a plurality of substrates. The adjusting step may include setting a time window based on a detection time of an endpoint criterion associated with the time window. The setting step may includes calculating a start time and end time from the detection time and a margin. The margin may be a preset percentage or the margin may be determined from a difference between detection times of two endpoint criteria. The adjusting step may be performed after each endpoint criteria is detected in its associated time window for a plurality of consecutive substrates.

In another aspect, the invention is directed to a chemical mechanical polishing system. The system has a polishing surface, a carrier head to hold a substrate in contact with the polishing surface, a motor coupled to one of the polishing surface and carrier head to generate relative motion between the polishing surface and substrate, an endpoint monitoring system, and a controller. The controller is configured to store a first endpoint criterion, a first time window for the first endpoint criterion, and a second endpoint criterion, to receive a signal from the monitoring system, to monitor the signal for the first endpoint criterion, to stop polishing at a default polishing time if the first endpoint criterion is not detected within the first time window, and to monitoring the signal for the second endpoint criterion and stop polishing when the second endpoint criterion is detected if the first endpoint criterion is detected within the first time window.

Implementations of the invention may include one or more of the following features. The endpoint monitoring system may direct a light beam to impinge a surface of the substrate during polishing. The controller may be configured to store a second time window for the second endpoint criterion. The controller may be configured to stop polishing at a default polishing time if the second endpoint criterion is detected before the second time window. The controller may be configured to stop polishing at the end of the second time window if the second endpoint criterion not detected.

In another aspect, the invention is directed to a computer-implemented control method for a chemical mechanical polishing operation. In the method, a first criterion, a first time window for the first criterion, and a second criterion are stored. A signal is received from a polishing endpoint detection system, and the signal is monitoring for the first criterion. If the first criterion is not detected within the first time window, a polishing parameter is changed a default polishing time. If the first criterion is detected within the first time window, the signal is monitored for the second criterion and the polishing parameter is changed if the second criterion is detected.

In another aspect, the invention is directed to a computer-implemented endpoint detection method for a chemical mechanical polishing operation. In the method, an endpoint criterion and a time window for the endpoint criterion are stored. A signal is received from a polishing endpoint detection system, and the signal is monitored for the endpoint criterion. Polishing is stopped at a default polishing time if the endpoint criterion is detected before the time window. If the endpoint criterion is detected within the time window, polishing is stopped when the endpoint criterion is detected.

Implementations of the invention may include the following features. Polishing can stop at an end of the time window if the endpoint criterion is not detected before the end of the time window.

Implementations of the invention may include zero or more of the following possible advantages. The endpoint detection procedure can be more robust and less likely to fail. Polishing can be stopped with reasonable accuracy even if the optical endpoint detector fails. The endpoint detection technique can be applied to both metal and oxide polishing. Overpolishing of the substrate can be reduced, and throughput can be increased.

Other features and advantages of the invention will become apparent from the following description, including the drawings and claims.

BRIEF DESCRIPTION OF THE DRAWINGS

FIG. 1 is an exploded perspective view of a chemical mechanical polishing apparatus.

FIG. 2 is a side view of a chemical mechanical polishing apparatus including an optical reflectometer.

FIG. 3 is a simplified cross-sectional view of a substrate being processed, schematically showing a laser beam impinging on and reflecting from the substrate.

FIG. 4 is a schematic view illustrating the path of a laser beneath the carrier head.

FIG. 5 is graph showing intensity measurements from the optical monitoring system in arbitrary intensity units.

FIG. 6 is a graph showing a reflected intensity trace of a substrate as a function of time.

FIG. 7 is a flowchart showing an initialization procedure performed by the endpoint detection system.

FIG. 8 is a flowchart showing an adaptive endpoint detection method performed by the endpoint detection system.

FIG. 9 is a flowchart showing another implementation of an endpoint detection method performed by the endpoint detection system.

DETAILED DESCRIPTION

Referring to FIGS. 1 and 2, one or more substrates 10 may be polished by a CMP apparatus 20. A description of a similar polishing apparatus 20 may be found in U.S. Pat. No. 5,738,574, the entire disclosure of which is incorporated herein by reference. Polishing apparatus 20 includes a series of polishing stations 22 and a transfer station 23. Transfer station 23 transfers the substrates between the carrier heads and a loading apparatus.

Each polishing station includes a rotatable platen 24 on which is placed a polishing pad 30. The first and second stations may include a two-layer polishing pad with a hard durable outer surface or a fixed-abrasive pad with embedded abrasive particles. The final polishing station may include a relatively soft pad. Each polishing station may also include a pad conditioner apparatus 28 to maintain the condition of the polishing pad so that it will effectively polish substrates.

A two-layer polishing pad 30 typically has a backing layer 32 which abuts the surface of platen 24 and a covering layer 34 which is used to polish substrate 10. Covering layer 34 is typically harder than backing layer 32. However, some pads have only a covering layer and no backing layer. Covering layer 34 may be composed of an open cell foamed polyurethane or a sheet of polyurethane with a grooved surface. Backing layer 32 may be composed of compressed felt fibers leached with urethane. A two-layer polishing pad, with the covering layer composed of IC-1000 and the backing layer composed of SUBA-4, is available from Rodel, Inc., of Newark, Del. (IC-1000 and SUBA-4 are product names of Rodel, Inc.).

A rotatable multi-head carousel 60 is supported by a center post 62 and is rotated thereon about a carousel axis 64 by a carousel motor assembly (not shown). Center post 62 supports a carousel support plate 66 and a cover 68. Carousel 60 includes four carrier head systems 70. Center post 62 allows the carousel motor to rotate carousel support plate 66 and to orbit the carrier head systems and the substrates attached thereto about carousel axis 64. Three of the carrier head systems receive and hold substrates, and polish them by pressing them against the polishing pads. Meanwhile, one of the carrier head systems receives a substrate from and delivers a substrate to transfer station 23.

Each carrier head system includes a carrier or carrier head 80. A carrier drive shaft 74 connects a carrier head rotation motor 76 (shown by the removal of one quarter of cover 68) to each carrier head 80 so that each carrier head can independently rotate about it own axis. In addition, each carrier head 80 independently laterally oscillates in a radial slot 72 formed in carousel support plate 66.

The carrier head 80 performs several mechanical functions. Generally, the carrier head holds the substrate against the polishing pad, evenly distributes a downward pressure across the back surface of the substrate, transfers torque from the drive shaft to the substrate, and ensures that the substrate does not slip out from beneath the carrier head during polishing operations.

Carrier head 80 may include a flexible membrane 82 that provides a mounting surface for substrate 10, and a retaining ring 84 to retain the substrate beneath the mounting surface. Pressurization of a chamber 86 defined by flexible membrane 82 forces the substrate against the polishing pad. Retaining ring 84 may be formed of a highly reflective material, or it may be coated with a reflective layer to provide it with a reflective lower surface 88. A description of a similar carrier head 80 may be found in U.S. patent application Ser. No. 08/861,260, filed May 21, 1997, the entire disclosure of which is incorporated by reference.

A slurry 38 containing a reactive agent (e.g., deionized water for oxide polishing) and a chemically-reactive catalyzer (e.g., potassium hydroxide for oxide polishing) may be supplied to the surface of polishing pad 30 by a slurry supply port or combined slurry/rinse arm 39. If polishing pad 30 is a standard pad, slurry 38 may also include abrasive particles (e.g., silicon dioxide for oxide polishing).

In operation, the platen is rotated about its central axis 25, and the carrier head is rotated about its central axis 81 and translated laterally across the surface of the polishing pad.

A hole 26 is formed in platen 24 and a transparent window 36 is formed in a portion of polishing pad 30 overlying the hole. Transparent window 36 may be constructed as described in U.S. patent application Ser. No. 08/689,930, filed Aug. 26, 1996, the entire disclosure of which is incorporated herein by reference. Hole 26 and transparent window 36 are positioned such that they have a view of substrate 10 during a portion of the platen's rotation, regardless of the translational position of the carrier head.

An optical monitoring system 40, which can function as a reflectometer or interferometer, is secured to platen 24 generally beneath hole 26 and rotates with the platen. The optical monitoring system includes a light source 44 and a detector 46. The light source generates a light beam 42 which propagates through transparent window 36 and slurry 38 (see FIG. 3) to impinge upon the exposed surface of substrate 10. For example, the light source 44 may be a laser and the light beam 42 may be a collimated laser beam. The light laser beam 42 can be projected from laser 44 at an angle from an axis normal to the surface of substrate 10, i.e., at an angle from axes 25 and 81. In addition, if the hole 26 and window 36 are elongated, a beam expander (not illustrated) may be positioned in the path of the light beam to expand the light beam along the elongated axis of the window. Laser 44 may operate continuously. Alternatively, the laser may be activated to generate laser beam 42 during a time when hole 26 is generally adjacent substrate 10.

The CMP apparatus 20 may include a position sensor 160, such as an optical interrupter, to sense when window 36 is near the substrate. For example, the optical interrupter could be mounted at a fixed point opposite carrier head 80. A flag 162 is attached to the periphery of the platen. The point of attachment and length of flag 162 is selected so that it interrupts the optical signal of sensor 160 while window 36 sweeps beneath substrate 10. The flag 162 may also interrupt the optical signal from a time just before to a time just after window 36 sweeps beneath carrier head 80.

In operation, CMP apparatus 20 uses optical monitoring system 40 to determine the amount of material removed from the surface of the substrate, or to determine when the surface has become planarized. A general purpose programmable digital computer 48 may be connected to laser 44, detector 46 and sensor 160. Computer 48 may be programmed to activate the laser when the substrate generally overlies the window, to store intensity measurements from the detector, to display the intensity measurements on an output device 49, to sort the intensity measurements into radial ranges, and to apply the endpoint detection logic to the measured signals to detect the polishing endpoint.

Referring to FIG. 3, a substrate 10 can include a silicon wafer 12 and a semiconductor, conductor or insulator layer 16 disposed over a patterned underlying layer 14, which may itself be a semiconductor, conductor or insulator layer, having a different refractive index or reflectivity. As different portions of the substrate with different reflectivities or refractive index are polished, the signal output from the detector 46 varies with time. For example, if a metal layer is polished away to expose an oxide or nitride layer, the reflectivity of the substrate drops. Alternately, as a dielectric layer is polished away, reflection from the top and bottom surfaces can create a varying interference signal. The time varying output of detector 46 may be referred to as an in-situ reflectance measurement trace (or more simply, a reflectance trace). As discussed below, this reflectance trace may be used to determine the end-point of the metal layer polishing operation.

Referring to FIG. 4, the combined rotation of the platen and the linear sweep of the carrier head causes window 36

(and thus laser beam 42) to sweep across the bottom surface of carrier head 80 and substrate 10 in a sweep path 120. Referring to FIG. 5, as the laser beam sweeps across the substrate, optical monitoring system 40 generates a series of intensity measurements $I_1, I_2, I_3, \ldots, I_N$ (the number N can differ from sweep to sweep). The sample rate F (the rate at which intensity measurements are generated) of optical monitoring system 40 may be about 500 to 2000 Hertz (Hz), or even higher, corresponding to a sampling period between about 0.5 and 2 milliseconds.

Each time the window sweeps beneath the substrate, the computer 48 extracts one or more values from the series of intensity measurements $I_1, I_2, I_3, \ldots, I_N$. For example, the series of intensity measurements can be averaged to generate a mean intensity $I_{MEAN}$. Alternately, the computer can extract the minimum intensity $I_{MIN}$ from the series, or the maximum intensity $I_{MAX}$. In addition, the computer can generate an intensity difference $I_{DIF}$ equal to the difference between the maximum and minimum intensities, i.e., $I_{MAX} - I_{MIN}$.

The series of values extracted by computer 48 for a series of sweeps can be stored in memory or non-volatile storage. Referring to FIG. 6, this series of extracted values (with one or more extracted value per sweep) can be assembled and displayed as a function of measurement time to provide the time-varying trace 60 of the reflectivity of the substrate. This time-varying trace may also be filtered to remove noise.

In order to detect the polishing endpoint, computer 48 searches for a series of endpoint criteria 62, 64 and 66 in the time-varying trace 60. Although a series of three endpoint criteria are illustrated, there could be just one or two endpoint criteria, or four or more endpoint criteria. Each endpoint criterion can include one or more endpoint conditions. Possible endpoint conditions include a local minimum or maximum, a change in slope, or a threshold value in intensity or slope, or a combination thereof. The endpoint criteria are typically set by the operator of the polishing machine through experimentation, analysis of endpoint traces from test wafers, and optical simulations. For example, when monitoring a reflectivity trace during oxide polishing, the operator may instruct the polishing machine to cease polishing if the computer 48 detects a first maximum 62, a minimum 64, and then a second maximum 66. In general, once the last endpoint criterion has been detected, the polishing operation is halted. Alternatively, polishing continue for a preset period of time after detection of the last endpoint criterion, and then halted.

Unfortunately, under some circumstances, the signal from the optical detector may be too weak or noisy for computer 48 to detect the endpoint criteria. In addition, a weak or noisy signal may result in an erroneous detection of the endpoint criteria (a false positive signal). Furthermore, on occasion the polishing operation does not proceed as expected due to changes in slurry concentration, a defective wafer, or the like. As a result, the signal from the optical detector is not similar to the expected reflectance trace, and the endpoint criteria may not be relevant to proper polishing of the substrate. In these situations, computer 48 can override the standard endpoint criteria, and instead end polishing based on a total default polishing time.

Details of the endpoint detection procedure 100 will be discussed with reference to the flowcharts in FIGS. 7 and 8. Initially, a series of endpoint criteria (e.g., local minima and maxima, changes in slope, or threshold values) are stored in computer memory or non-volatile storage. In addition, each endpoint criteria is associated with a time window. For example, endpoint criterion 62 is associated with a first time window $T_{start1}$ to $T_{end1}$, endpoint criterion 64 is associated with a second time window $T_{start2}$ to $T_{end2}$, and endpoint criterion 66 is associated with a third time window $T_{start3}$ to $T_{end3}$ (see FIG. 6). The time windows may be set initially through experimentation or theoretical analyses of when, assuming normal polishing operations, the endpoint criteria should occur.

Referring to FIG. 7, the endpoint detection procedure can include an initialization procedure 100. In brief, the initialization procedure requires that a sequential series of a preset number of substrates, e.g., five or more substrates, be successfully polished using the optical monitoring system. Until the initialization procedure is complete, polishing is stopped based either on a successful optical monitoring or on a maximum polishing time. After the initialization procedure is complete, an adaptive endpoint detection procedure is activated.

In the initialization procedure 100, a counter m is initialized (step 102), and the first endpoint criterion and associated time window $T_{start1}$ and $T_{end1}$ are loaded into computer 48 (step 104). Polishing of the substrate begins (step 106), and the computer starts a timer to measure the total elapsed polishing time for the substrate. During polishing, the computer is set to detect either the loaded endpoint criterion or the end of the polishing window. If the computer detects the endpoint criterion before the start $T_{start}(n)$ of the time window (step 108), or if the timer reaches the end $T_{end}(n)$ of the time window before the endpoint criterion (step 110), then the computer switches to timed polishing and stops relying on the optical monitoring system (step 112). If the computer detects the endpoint criterion in the time window, the next endpoint criterion is loaded (step 114). If every endpoint criterion is detected with the optical monitoring system within the associated time window, the polishing operation stops when the last endpoint criterion is detected (step 116), and the counter m is incremented (step 118). On the other hand, if any of the endpoint criteria are not properly detected, then polishing halts at the maximum polishing time $T_{max}$ (step 120) and the counter m is reset to zero (step 122). In either case, polishing then proceeds with the next substrate (step 124). Once the counter reaches a preset number (step 126), e.g., five or more, the adaptive endpoint detection procedure 150, discussed below, is activated (step 128).

The adaptive endpoint detection procedure 150 is illustrated in FIG. 8. Initially, the first endpoint criterion and associated time window $T_{start}(1)$ and $T_{end}(1)$ are loaded into computer 48 (step 152). The default polishing time $T_{default}$ is also loaded into the computer. Polishing of the substrate begins (step 154), and the computer starts a timer to measure the total elapsed polishing time for the substrate. During polishing, the computer is set to detect either the loaded endpoint criterion or the end $T_{end}(n)$ of the time window for the endpoint criterion.

If the endpoint criterion is detected during the time window, i.e., after the start time $T_{start}(n)$ (step 156) but before the end time $T_{end}(n)$ (step 160), then the time $T_{detect}(n)$ at which the endpoint criterion was detected can be stored in the computer for later use in adjusting the time window (step 162). If there are endpoint criteria remaining in the series (step 164), then the next endpoint criterion and associated time window are loaded into computer 48 (step 166), and the computer is set to detect the newly loaded endpoint criterion or end time $T_{end}(n)$ (returning to step 156). On the other hand, if this is the last endpoint criterion in the series, the computer stops the polishing operation (step 168). In this case, the last detected time $T_{detect}$ represents the total polishing time for the substrate.

If an endpoint criterion is detected before the start $T_{start}(n)$ of the associated time window (step 156), the computer switches to a timed polishing mode (step 176), and does not rely on the optical monitoring system. In this mode, the computer simply stops the polishing operation once the timer indicates that a default polishing time $T_{default}$ has been reached (steps 178 and 174).

If the time window expires before the endpoint criterion is detected, i.e., $T_{end}(n)$ is detected before the endpoint criterion, then the computer determines whether this was the last detection point in the series (step 172). If it is the last criterion in the series, then polishing is stopped (step 174), since the maximum polish time $T_{max}$ has been reached. If it is not the last criterion, the computer switches to a timed polishing mode (step 176), and stops relying on the optical monitoring system.

Assuming the polishing operation was stopped based on a timed polishing mode or at the end $T_{end}(n)$ of the last time window, then the counter m is reset to zero and the next substrate is polished with the initialization procedure 100 (step 184).

On the other hand, assuming the polishing operation was stopped successfully based on an optically detected endpoint, the default polishing time $T_{default}$ and/or the time windows for the endpoint criteria can be adjusted (step 180). In one implementation, the default polishing time can be set equal to the total polishing time from the last successfully endpoint detection procedure. Alternatively, the computer can calculate a running average of the total polishing time for a preset number, e.g., five to ten, of polishing operations that end with a successful endpoint detection procedure. In this case, the computer can set the default polishing time equal to this running average. This permits the default polishing time to be adjusted for variations in the polishing parameters, such as pad wear and slurry use, based on successful endpoint detection procedures. Then next substrate can then be polished with the adaptive endpoint detection procedure 150 (step 182).

The time windows for the endpoint criteria may also be adjusted. The new time windows can be calculated based on the detection time $T_{detect}$ from one or more prior successful endpoint detection procedures. For example, the start and end times can be calculated from the detection time $T_{detect}$, plus or minus a margin, e.g., 10%. The margin can be preset, or the difference between detection times can be used to modify this margin. For example, if the difference $T_{detect1} - T_{detect2}$ increases, the margin can increase so that the window between the start and end times also increases.

Referring to FIG. 9, an alternative adaptive endpoint detection procedure 200 is illustrated. This endpoint detection procedure is similar to adaptive endpoint detection procedure 150, but it continues to search for endpoints with the optical monitoring system even after a failure in the optical monitoring system. This endpoint detection procedure would be appropriate if the polishing conditions are relatively stable and the primary difficulty in the monitoring system is noise that obscures the signal.

Initially, the first endpoint criterion and associated time window $T_{start}(1)$ and $T_{end}(1)$ are loaded into computer 48 (step 152'). The default polishing time Tdefault is also loaded into the computer. Polishing of the substrate begins (step 154'), and the computer starts a timer to measure the total elapsed polishing time for the substrate. During polishing, the computer is set to detect the loaded endpoint criterion, the expiration of the default polishing time $T_{default}$, or the end $T_{end}(n)$ of the time window for the endpoint criterion. If the endpoint criterion is detected before the start $T_{start}(n)$ of the time window (step 202), and if this is not the last endpoint criterion (step 204), then the next endpoint criterion is loaded (step 166'). If this is the last endpoint criterion, then polishing the system switches to a timed polishing mode (step 205) to detect the default time $T_{default}$ (step 206), and polishing is halted based on the expiration of the default time $T_{default}$ (step 174'). If the endpoint criterion is not detected before the start time $T_{start}(n)$, but the timer reaches the default time $T_{default}$ before the endpoint criterion is detected (step 208), then polishing is halted based on the default polishing time $T_{default}$ (step 174'). If the end $T_{end}(n)$ of the time window occurs before the endpoint criterion is detected (step 212), and if this is not the last endpoint criterion (step 214), then the next endpoint criterion is loaded (step 166'). If the end $T_{end}(n)$ of the time window occurs before the endpoint criterion is detected, and it is the last endpoint criterion, polishing is stopped based on the end time $T_{end}(n)$ (step 174'). If the polishing criteria is detected inside the polishing window (step 218), then the time $T_{detect}$ at which the criterion is detected is stored (step 162'), and the start and end times $T_{start}(n)$ and $T_{end}(n)$ of the polishing window and the default polishing time $T_{default}$ can be adjusted (step 180'). If this was the last polishing criteria (step 220), then polishing is halted. Once polishing has been stopped, processing of a new substrate can begin (steps 182' and 184'), either with the adaptive endpoint detection procedure 200 or with the initialization procedure 100.

In summary, by using this endpoint detection method, under normal polishing conditions and with a good reflectivity signal, the endpoint will be triggered normally by the optical monitoring system. However, if any of the endpoint criteria do not fall within the expected time ranges, this indicates either that the polishing operation is abnormal or that the optical monitoring system has failed, e.g., because the signal is too weak or has too much noise. In this situation, the endpoint is triggered at a default polishing time. Since the default polishing time can be adjusted based on the polishing times of successful endpoint detection operations, the endpoint detection method can compensate for variations in the polishing conditions on the CMP apparatus over time. In fact, in adaptive endpoint detection procedure 150, the only situation in which the substrate typically would be overpolished is if all of the endpoint criteria except the last are detected successfully. In this case, the polishing operation stops at the maximum polishing time $T_{max}$.

Of course, there are many possible algorithms to carry out the logic represented by the flowcharts of FIGS. 4–6. For example, steps can be performed in a different order, so long as the end result is to trigger the endpoint on a default polishing time (other than simply a maximum polishing time) if the optical monitoring system fails to detect one of the endpoint criteria. Recalculation of the default time or time windows need not occur immediately, but can be delayed, e.g., until after another substrate has been polished.

Given the average, minimum, maximum and differential intensity traces, a wide variety of endpoint detection algorithms can be implemented. Separate endpoint criteria (e.g., based on local minima or maxima, slope, or threshold values) can be created for each type of trace, and the endpoint conditions for the various traces can be combined with Boolean logic. The intensity traces may also be created for a plurality of radial ranges on the substrate. The generation of intensity traces for a plurality of radial ranges is discussed in U.S. application Ser. No. 09,184,767, filed Nov. 2, 1998, the entirety of which is incorporated by reference.

The endpoint criteria can also be used to trigger a change in polishing parameters. For example, when the optical monitoring system detects the second endpoint criterion, the CMP apparatus may change the slurry composition (e.g., from a high-selectivity slurry to a low selectivity slurry). In this implementation, there may be a default time $T_{default}(n)$ associated with each endpoint criterion at which a polishing parameter can change. These default times $T_{default}(n)$ can function in the same way as the default time $T_{default}$ for the polishing endpoint. Specifically, under normal operations, the change in polishing parameters can be triggered upon detection of the associated endpoint criterion. However, if the optical monitoring system fails, then the change in polishing parameters can be triggered at the associated default time $T_{default}(n)$. Continuing the example above, if the first endpoint criterion is not detected in the first time window, or if the second endpoint criterion is detected before the second time window, then the change in slurry composition can be triggered at the default time $T_{default}(2)$. If the first endpoint criterion is detected normally but the second endpoint criterion is not detected, the change in slurry composition can be triggered at the end $T_{end2}$ of the second time window. However, if both the first and second endpoint criteria are detected in their respective time windows, then the change in polishing parameters will be triggered at the detection of the second endpoint criterion.

Although one implementation has been described for an interferometric signal from an oxide polishing operation, the endpoint detection process would be applicable to other polishing operations, such as metal polishing, and to other optical monitoring techniques, such as reflectometry, spectrometry and ellipsometry. In addition, although the invention has been described in terms of an optical monitoring system, principles of the invention may also be applicable to other chemical mechanical polishing endpoint monitoring systems, such as capacitance, motor current, or friction monitoring system.

The present invention has been described in terms of a preferred embodiment. The invention, however, is not limited to the embodiment depicted and described. Rather, the scope of the invention is defined by the appended claims.

What is claimed is:

1. A computer-implemented endpoint detection method for a chemical mechanical polishing operation, comprising:
    storing a first endpoint criterion, a first time window for the first endpoint criterion, and a second endpoint criterion;
    receiving a signal from a polishing endpoint detection system;
    monitoring the signal for the first endpoint criterion;
    if the first endpoint criterion is not detected within the first time window, stopping polishing at a default polishing time; and
    if the first endpoint criterion is detected within the first time window, monitoring the signal for the second endpoint criterion and stopping polishing if the second endpoint criterion is detected.

2. The method of claim 1, further comprising storing a second time window for the second endpoint criterion.

3. The method of claim 2, wherein if the second endpoint criterion is detected before the second time window, stopping polishing at a default polishing time.

4. The method of claim 2, wherein if the second endpoint criterion not detected, stopping polishing at the end of the second time window.

5. The method of claim 2, further comprising storing a third endpoint criterion, and a third time window for the third endpoint criterion, the third time window being located before the first time window.

6. The method of claim 5, wherein if the third endpoint criterion is not detected within the third time window, stopping polishing at a default polishing time.

7. The method of claim 2, further comprising storing a detection time at which the second endpoint criterion is detected.

8. The method of claim 7, further comprising modifying the default polishing time if the second endpoint criterion is detected within the second time window.

9. The method of claim 1, further comprising storing a detection time at which the first endpoint criterion is detected.

10. The method of claim 9, further comprising modifying the first time window if the first endpoint criterion is detected within the first time window.

11. The method of claim 1, wherein endpoint detection system optically monitors a substrate.

12. The method of claim 11, wherein the polishing operation polishes a metal layer on the substrate.

13. The method of claim 11, wherein the polishing operation polishes a dielectric layer on the substrate.

14. The method of claim 1, wherein the endpoint detection method is performed after the first endpoint criteria is detected in the first time window and the second endpoint criteria is detected in the second time window for a plurality of consecutive substrates.

15. A computer-implemented endpoint detection method for a chemical mechanical polishing operation, comprising:
    a) storing a series of N endpoint criteria, each endpoint criteria associated with a time window, N being equal to or greater than 2;
    b) receiving a signal from a polishing endpoint detection system;
    c) monitoring the signal for the series of endpoint criteria;
    d) determining whether an endpoint criterion is detected within the associated time window;
    e) if the endpoint criterion is detected within the associated time window, monitoring the signal for the next endpoint criterion in the series; and
    f) iterating the determining and monitoring steps until any of the following occur
        i) one of the endpoint criterion is not detected within the associated time window, and stopping polishing at a default polishing time,
        ii) a last endpoint criterion is detected within the associated time window, and stopping polishing based on detection of the last endpoint criterion.

16. A method of chemical mechanical polishing, comprising:
    bringing a substrate into contact with a polishing surface;
    causing relative motion between the substrate and the polishing surface;
    storing a first endpoint criterion, a first time window for the first endpoint criterion, and a second endpoint criterion;
    receiving a signal from an optical monitoring system that directs a light beam to impinge a surface of the substrate being polished;
    monitoring the signal for the first endpoint criterion;
    if the first endpoint criterion is not detected within the first time window, stopping polishing at a default polishing time; and if the first endpoint criterion is detected within the first time window, monitoring the signal for the second endpoint criterion and stopping polishing when the second endpoint criterion is detected.

17. A method of chemical mechanical polishing, comprising:
bringing a substrate into contact with a polishing surface;
causing relative motion between the substrate and the polishing surface;
storing a plurality of endpoint criteria, a plurality of time windows, each endpoint criterion associated with one of the time windows, and a default polishing time;
monitoring a signal from an endpoint detection system for the endpoint criteria;
storing times at which the endpoint criteria are detected;
stopping polishing after one of the default polishing time or detection of a last of the endpoint criteria; and
adjusting at least one of the default polishing time and the time windows based on at least one of the times at which an endpoint criterion was detected.

18. The method of claim 17, wherein the adjusting step occurs if each endpoint criterion is detected in its associated time window.

19. The method of claim 18, wherein the adjusting step includes setting the default polishing time equal to a time of detection of the last of the endpoint criteria.

20. The method of claim 18, wherein the adjusting step includes setting the default polishing time equal to an average of detection times of the last of the endpoint criteria in a plurality of substrates.

21. The method of claim 18, wherein the adjusting step includes setting a time window based on a detection time of an endpoint criterion associated with the time window.

22. The method of claim 21, wherein the setting step includes calculating a start time and end time from the detection time and a margin.

23. The method of claim 22, wherein the margin is a preset percentage.

24. The method of claim 22, wherein the margin is determined from a difference between detection times of two endpoint criteria.

25. The method of claim 17, wherein the adjusting step is performed after each endpoint criteria is detected in its associated time window for a plurality of consecutive substrates.

26. A chemical mechanical polishing system, comprising:
a) a polishing surface;
b) a carrier head to hold a substrate in contact with the polishing surface;
c) a motor coupled to one of the polishing surface and carrier head to generate relative motion between the polishing surface and substrate;
d) an endpoint monitoring system; and
e) a controller configured to
i) store a first endpoint criterion, a first time window for the first endpoint criterion, and a second endpoint criterion,
ii) receive a signal from the monitoring system,
iii) monitor the signal for the first endpoint criterion;
iv) if the first endpoint criterion is not detected within the first time window, stop polishing at a default polishing time, and
v) if the first endpoint criterion is detected within the first time window, monitoring the signal for the second endpoint criterion and stopping polishing when the second endpoint criterion is detected.

27. The apparatus of claim 26, wherein the endpoint monitoring system directs a light beam to impinge a surface of the substrate during polishing.

28. The apparatus of claim 26, wherein the controller is configured to store a second time window for the second endpoint criterion.

29. The method of claim 28, wherein the controller is configured to stop polishing at a default polishing time if the second endpoint criterion is detected before the second time window.

30. The method of claim 28, wherein the controller is configured to stop polishing at the end of the second time window if the second endpoint criterion not detected.

31. A computer-implemented endpoint detection method for a chemical mechanical polishing operation, comprising:
storing a first criterion, a first time window for the first criterion, and a second criterion;
receiving a signal from a polishing endpoint detection system;
monitoring the signal for the first criterion;
if the first criterion is not detected within the first time window, changing a polishing parameter of the chemical mechanical polishing operation at a default polishing time; and
if the first criterion is detected within the first time window, monitoring the signal for the second criterion and changing the polishing parameter if the second criterion is detected.

32. A computer-implemented endpoint detection method for a chemical mechanical polishing operation, comprising:
storing an endpoint criterion and a time window for the endpoint criterion;
receiving a signal from a polishing endpoint detection system;
monitoring the signal for the endpoint criterion;
if the endpoint criterion is detected before the time window, stopping polishing at a default polishing time; and
if the endpoint criterion is detected within the time window, stopping polishing when the endpoint criterion is detected.

33. The endpoint detection method of claim 32, further comprising stopping polishing at an end of the time window if the endpoint criterion is not detected before the end of the time window.

* * * * *